(12) United States Patent
Couchey et al.

(10) Patent No.: US 7,237,746 B2
(45) Date of Patent: Jul. 3, 2007

(54) SPOOL HAVING REVERSING SPIRAL GUIDE

(75) Inventors: Brian P. Couchey, Inman, SC (US); Victor J. DesRosiers, Kinderhook, NY (US)

(73) Assignee: Sonoco Development, Inc., Hartsville, SC (US)

( * ) Notice: Subject to any disclaimer, the term of this patent is extended or adjusted under 35 U.S.C. 154(b) by 115 days.

(21) Appl. No.: 10/731,754

(22) Filed: Dec. 8, 2003

(65) Prior Publication Data

US 2005/0139723 A1 Jun. 30, 2005

(51) Int. Cl.
B65H 75/18 (2006.01)
(52) U.S. Cl. .................... 242/603; 242/609.1
(58) Field of Classification Search ............. 242/603, 242/609, 118.4, 118.41, 609.1
See application file for complete search history.

(56) References Cited

U.S. PATENT DOCUMENTS

| 218,722 | A | 8/1879 | Eldridge |
| 1,456,108 | A | 5/1923 | Johannesen |
| 2,501,596 | A | 3/1950 | Denny |
| 2,811,322 | A | 10/1957 | Wilkinson |
| 3,610,549 | A | 10/1971 | Wennerstrom |
| 3,948,458 | A | 4/1976 | Beck et al. |
| 4,219,274 | A | 8/1980 | Dabby et al. |
| 4,387,863 | A | 6/1983 | Edmonston et al. |
| 4,445,649 | A | 5/1984 | Yataki et al. |
| 4,602,751 | A | 7/1986 | Vogel |
| 4,653,331 | A | 3/1987 | Inouye et al. |
| 4,657,203 | A | 4/1987 | Crawford |
| 4,667,896 | A | 5/1987 | Frey et al. |
| 4,696,438 | A | 9/1987 | Myers |
| 4,715,549 | A | 12/1987 | Travlos |
| 4,715,594 | A | 12/1987 | Isobe et al. |
| 4,753,399 | A | 6/1988 | Baum |
| 4,781,461 | A | 11/1988 | Baron et al. |
| 4,793,708 | A | 12/1988 | Bednarz |
| 4,796,830 | A | 1/1989 | Gelfman |
| 4,802,270 | A | 2/1989 | Kashiwaya et al. |
| 4,880,182 | A | 11/1989 | Gelfman |
| 4,938,432 | A | 7/1990 | Kurt et al. |
| 5,067,665 | A | 11/1991 | LoStracco et al. |

(Continued)

FOREIGN PATENT DOCUMENTS

DE 298 07 873 U1 9/1998

(Continued)

*Primary Examiner*—John Q. Nguyen
(74) *Attorney, Agent, or Firm*—DLA Piper US LLP

(57) ABSTRACT

A winding device includes a barrel defining a primary winding area and an auxiliary winding area. A flange wall separates the primary and auxiliary winding areas. A guide pathway directs a flexible material between the primary and auxiliary winding areas and includes opposite end segments curving in a circumferential direction. The pathway also includes a transition segment between the end segments in which the circumferential direction of curvature is reversed to provide for simultaneous winding of material in the primary and auxiliary winding areas. The device may include inserts received within the barrel having channels formed in an outer surface to define the pathway between the inserts and the barrel. Alternatively, the device may include a flange body defining an interior and a cover enclosing the interior. Structure having correspondingly formed first and second parts respectively carried by flange body and cover define the pathway within the interior.

17 Claims, 8 Drawing Sheets

U.S. PATENT DOCUMENTS

| | | |
|---|---|---|
| 5,071,082 A | 12/1991 | Lefevre et al. |
| 5,100,078 A | 3/1992 | Clark |
| 5,165,543 A | 11/1992 | Heyda et al. |
| 5,193,761 A | 3/1993 | Fritz et al. |
| 5,205,510 A | 4/1993 | Schotter |
| 5,220,632 A | 6/1993 | LoStracco |
| 5,236,145 A | 8/1993 | Floury et al. |
| 5,335,874 A | 8/1994 | Shrum et al. |
| 5,379,965 A | 1/1995 | Isler et al. |
| 5,593,101 A | 1/1997 | Varga |
| 5,718,397 A | 2/1998 | Stevens |
| 5,890,674 A | 4/1999 | Major |
| 5,895,005 A | 4/1999 | Simchock |
| 5,908,172 A | 6/1999 | Pierro et al. |
| 5,971,316 A | 10/1999 | Kim |
| 6,098,918 A | 8/2000 | Simchock |
| 6,511,009 B1 | 1/2003 | Harrison et al. ......... 242/388.5 |
| 6,883,744 B2 | 4/2005 | Couchey et al. |
| 2003/0146333 A1 | 8/2003 | Couchey et al. |

FOREIGN PATENT DOCUMENTS

| | | |
|---|---|---|
| EP | 0699616 A2 | 3/1996 |
| EP | 0 699 616 B1 | 3/1998 |
| EP | 1312571 A2 | 5/2003 |
| JP | 200219433 A | 8/2000 |

SPOOL HAVING REVERSING SPIRAL GUIDE

FIELD OF THE INVENTION

The present invention relates to spools for storing and transporting lengths of flexible materials. More particularly, the present invention relates to a spool for optical media such as optical fibers and the like.

BACKGROUND OF THE INVENTION

Spools for storing and transporting flexible materials are known. The spools typically include a barrel portion and end flanges defining a space for winding receipt of a length of the flexible material. Spools for optical media are also known as disclosed in U.S. Pat. No. 5,908,172 to Pierro et al., which is incorporated herein by reference.

When a length of flexible material is wound onto a spool, the portion of the material that is first received on the barrel becomes covered by subsequently wound portions of the material. For optical media such as optical fiber, however, it is desirable to provide access to both ends of the material for integrity testing to determine if kinks or other defects would impair the ability of the length of optical fiber to transmit light.

To provide access to both ends of a length of optical fiber, an end portion of the fiber adjacent the first wound portion is led away from the barrel to a more easily accessed location. Care must be taken, however, when directing the end portion of the fiber that the fiber is not damaged or that sharp bends are not introduced that could be mistaken for actual damage of the fiber during the integrity testing of the material.

SUMMARY OF THE INVENTION

According to the present invention, there is provided a device for winding an elongated flexible material. The winding device includes a barrel that defines a primary winding area and a flange wall connected to the barrel. The winding device also includes an auxiliary winding area that is separated from the primary winding area by the flange wall.

The winding device further includes a guide pathway having opposite ends communicating with the primary and auxiliary winding areas for directing an elongated flexible material between the primary and auxiliary winding areas. The guide pathway includes opposite end segments interconnected by a transition segment. At least a portion of each of end segment of the guide pathway is curved in a substantially circumferential direction with respect to an axis of rotation of the winding device. The guide pathway reverses in direction of curvature in the transition segment. The reversal in direction of curvature by the guide pathway provides for simultaneous winding of an elongated flexible material in the primary and auxiliary winding areas.

According to one embodiment, the winding device includes an insert received within an interior defined by the barrel to define at least a portion of the guide pathway. The insert includes a channel in an outer surface of the insert to define the portion of the guide pathway between the outer surface of the insert and an inner surface of the barrel.

The winding device of the various embodiments may include first and second barrel parts each defining a portion of the primary winding area. The winding device may also include first and second inserts each received within an interior of the barrel part through an open end thereof. Each of the inserts extends from the open end of the barrel part to define an auxiliary winding area. The winding device may also include first and second guide pathways each communicating with the primary winding area and one of the auxiliary winding areas.

According to another embodiment, the winding device includes a flange having a flange body. The flange body includes a substantially planar wall portion connected to the barrel of the winding device and a substantially cylindrical wall portion connected to the substantially planar wall portion. The planar wall portion of the flange body and the cylindrical wall portion of the flange body define a flange interior. The guide pathway for the winding device is located within the flange interior.

The winding device may include a cover received by the flange body to enclose the flange interior. The cover includes a cylindrical wall portion slidingly received by the cylindrical wall portion of the flange body and a substantially planar wall portion connected to the cylindrical wall portion of the flange cover. The auxiliary winding area is defined by a substantially cylindrical member connected to the planar wall portion of the cover opposite the cylindrical wall portion of the cover.

The guide pathway of the winding device is defined by guide structure that includes first and second parts located within the flange interior and respectively carried by the flange body and the cover. The first and second parts of the guide structure define ramping surfaces that are correspondingly formed to define the guide pathway therebetween.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown. In the drawings.

DETAILED DESCRIPTION OF THE DRAWINGS

Figure 1:
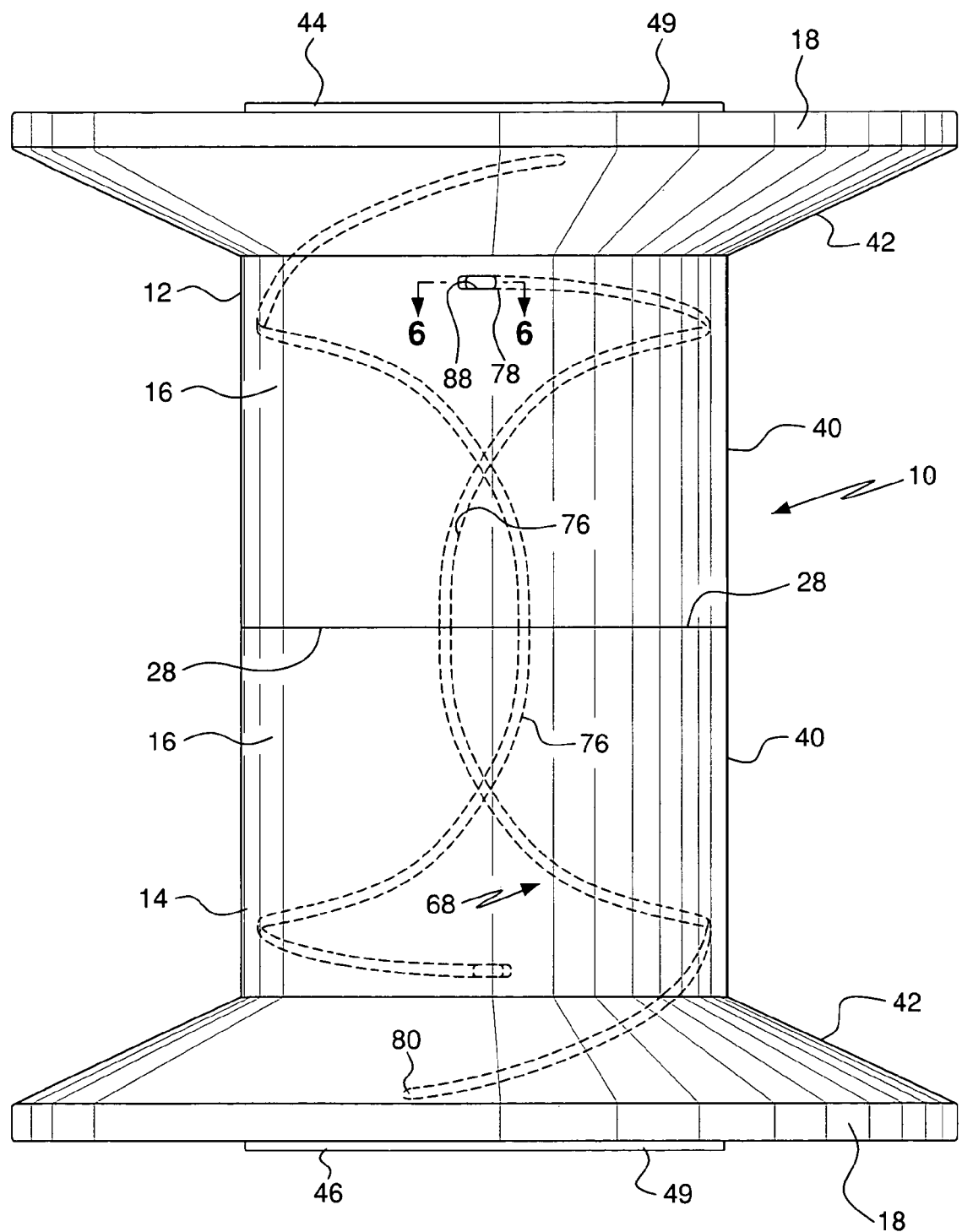
FIG. 1 is a side elevation view of a spool incorporating features of the present invention.
Figure 2:
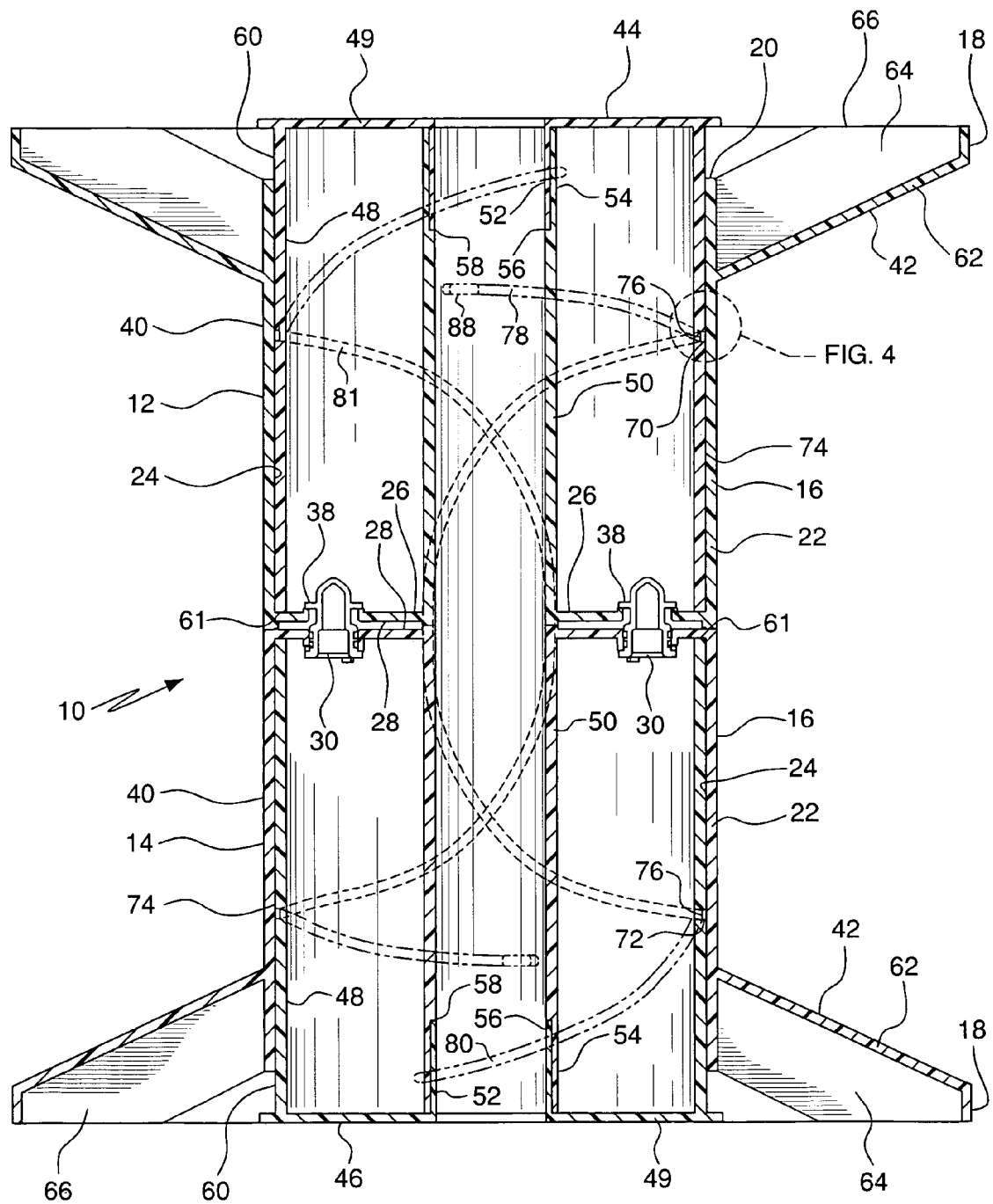
FIG. 2 is a sectional view of the spool of FIG. 1.
Figure 3:
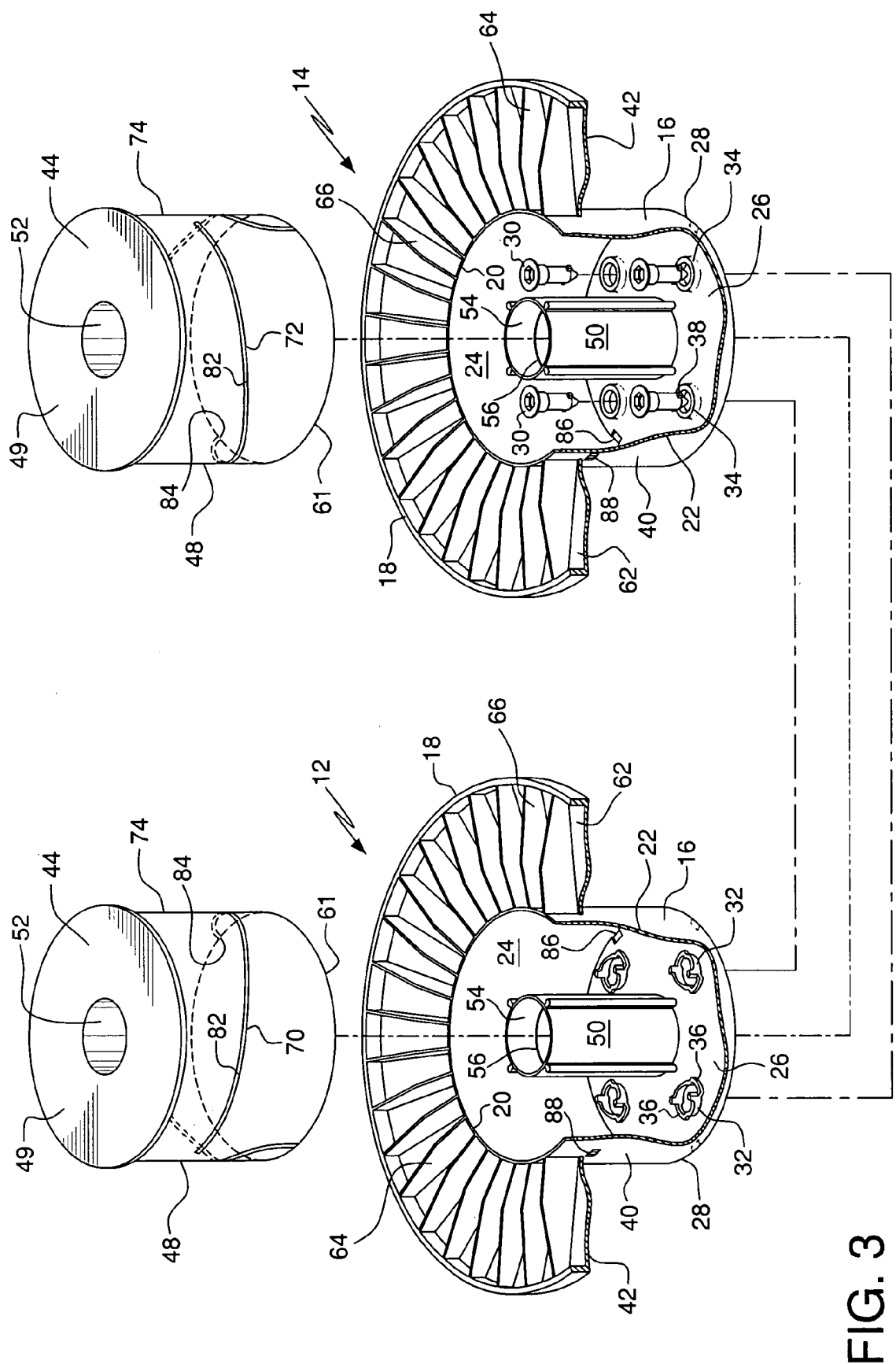
FIG. 3 is an exploded perspective view of the spool of FIG. 1.

Referring to the drawings where like numerals identify like elements, there is shown in FIG. 1 a spool 10 incorporating the present invention. The spool 10 is adapted for receiving a length of flexible material wound onto the spool. The spool 10 is segmental in construction and includes first and second spool halves 12, 14. Each of the spool halves 12, 14 includes a barrel portion 16 and a flange 18 secured to the barrel portion 16 adjacent an open end 20 of the barrel portion. Preferably, as shown in FIG. 2, the flanges 18 are integrally formed with the barrel portions 16, in a plastic molding process for example. Each barrel portion 16 includes a cylindrical wall 22 having an inner surface 24 that defines an interior for the barrel portion. Each barrel portion 16 further includes an end wall 26 at a second end 28. Referring to FIG. 3, the spool halves 12, 14 are secured together by fasteners 30 received through aligned openings 32, 34 in the barrel portion end walls 26. Preferably, the fasteners 30 and the openings 32, 34 incorporate a quick-release construction of the type described in U.S. Pat. No. 5,908,172. As shown in FIG. 2, the openings 34 of spool half 14 include slotted ends 36 for receipt of tabs 38 formed on opposite sides of the fasteners 30.

As shown in FIG. 1, the barrel portion 16 of each spool half 12, 14 defines an outer surface 40. The outer surfaces 40 of the barrel portions 16 define a primary winding area for windingly receiving a portion of a length of an optical fiber material. The flange 18 of each spool half 12, 14 defines a surface 42 that is connected to the surface 40 of the associated barrel portion 16. The connection between the surfaces 40, 42 serves to limit removal of optical fiber from the spool 10 that has been wound onto the primary winding area defined by the barrel portions 16.

The spool 10 further includes first and second inserts 44, 46. The first and second inserts 44, 46 are respectively dimensioned for receipt within the barrel portions 16 of the first and second spool halves 12, 14. Each insert 44, 46 includes a cylindrical body 48 and an end wall 49 connected to the body. A central post 52 extends from the end wall 49 into an interior defined by the body 48 and is dimensioned for sliding receipt within a central post 50 connected to the end wall 26 of the associated spool halves 12, 14. The central posts 50 of the barrel portions 16 include a recessed end 54 for receiving the central post 52 of the associated insert 44, 46.

As shown in FIG. 2, each recessed ends 54 defines an annular shoulder 56 contacted by an end 58 of the central post 52. As a result, a portion 60 of the body 48 of the associated insert 44, 46 extends beyond the open end 20 of the barrel portion 16. In an alternative construction, the extending portions 60 of the body 48 of the inserts 44, 46 could be established through contact between an end 61 of the body 48 and the end wall 26 of the associated barrel portion 16. Each of the end walls 26, 49 defines a central opening, and each of the central posts 50, 52 is hollow, such that a passageway extending through the spool 10 is defined as shown in FIG. 2.

Each of the extending portions 60 of the insert bodies 48 includes an outer surface defining an auxiliary, or secondary, winding area. As will be described in greater detail, each of the auxiliary winding areas of the spool 10 provides a location for winding of an end portion of an elongated material, such as an optical fiber, directed to the auxiliary winding area from the primary winding area. As shown in FIG. 2, the end wall 49 of each insert 44, 46 includes an outer peripheral portion that extends outwardly from the auxiliary winding surface of the extending portion 60 to define a flange for retaining material wound onto the auxiliary winding area.

Referring to FIGS. 2 and 3, each of the flanges 18 of spool 10 includes a wall 62, which defines the flange surface 42 discussed above in regard to the primary winding area. The flange wall 62 is reinforced by a plurality of rib members 64 spaced about the flange 18 as shown in FIG. 3. As shown, the flange walls 62 and the associated reinforcing rib members 64 are angled obliquely with respect to the barrel portion 16 to which they are connected. The obliquely-angled flange wall 62 defines an interior such that the open end 20 of the associated barrel portion 16 is recessed longitudinally with respect to the spool 10 within the interior of the flange 18. As a result, the auxiliary winding area defined by the extending portion 60 of the associated insert 44, 46 will also be longitudinally recessed within the interior of the flange 18. Recessing of the auxiliary winding area within the flange in this manner limits exposure of an end portion of an elongated material wound thereon. Such limited exposure is especially desirable for optical media, such as optical fibers, which might otherwise be damaged, were the end portion to be exposed at the end of the spool 10. The relative extension between the inserts 44, 46 and the associated barrel portions 16 may vary from that shown. It may be desirable, for example, to dimension the inserts 44, 46 such that a portion of the auxiliary winding area is not recessed within the flange interior in order to facilitate access to the auxiliary winding area.

The spool 10 includes a material guide system 68. As will be described in greater detail, the guide system 68 provides for direction of an elongated material, such as an optical fiber, from the primary winding area to one of the auxiliary winding areas defined by the extending portions 60 of the barrel inserts 44, 46. A spool having a material guide system for directing an end portion of a flexible material from a primary winding area to an auxiliary winding area is disclosed in commonly assigned U.S. patent application Ser. No. 10/295,214, filed Nov. 13, 2002, which is incorporated herein by reference. The material guide system 68 of the present invention provides curved guide paths each including a reversing helical portion between the primary winding area and one of the auxiliary winding areas. The reversing helical pathway of the present invention functions to orient an elongated material such that portions of the same length can be simultaneously wound onto the primary winding area and one of the auxiliary winding areas during rotation of the spool 10. The reversing helical pathway of the present invention provides such orienting of the elongated material without introducing sharp bends into the material, which could damage an optical fiber or result in a false indication of impairment of the optical fiber during integrity testing.

Figure 4:
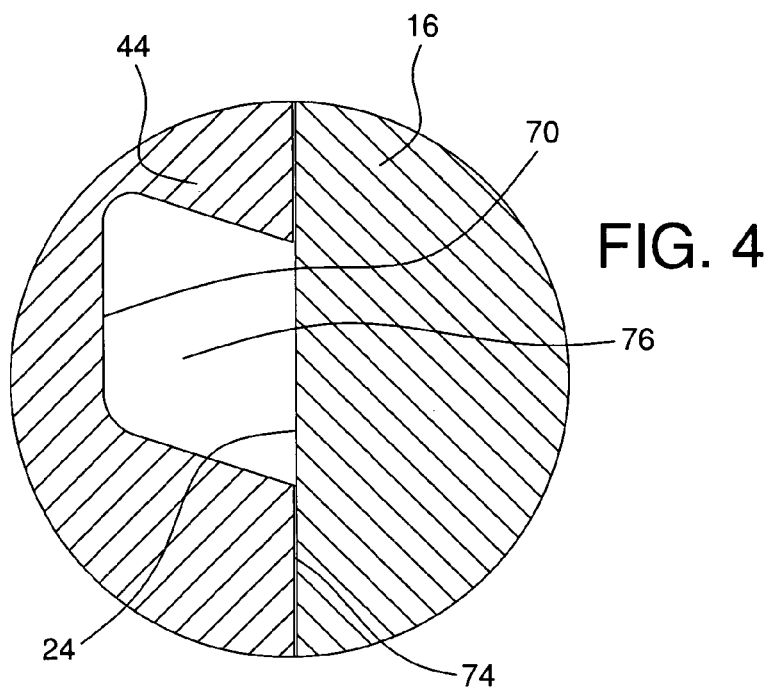
FIG. 4 is an enlarged detail of FIG. 2.

Referring to FIGS. 2–4, barrel insert 44 includes a channel segment 70 formed in an outer surface 74 thereof and barrel insert 46 includes a channel segment 72 formed in its outer surface 74. When the inserts 44, 46 are received in the barrel portions 16 of the spool halves 12, 14, as shown in FIGS. 2 and 4, the channel segments 70, 72 and the inner surfaces 24 of the barrel portions 16 define an enclosed guide pathway 76. As described below, the spool 10 is adapted to provide for communication between the segments of the pathway 76 separately provided by the channel segments 70, 72. As a result the material guide pathway 76 extends continuously between opposite first and second ends 78, 80 of the pathway. As shown in FIGS. 1 and 2, the first end 78 of the guide pathway 76 is located between the flange surfaces 42 of the spool halves 12, 14 adjacent the flange surface 42 of spool half 12. The guide pathway 76 extends along the barrel portions 16 as shown such that the second end 80 of the pathway 76 is located within the interior defined by the flange 18 of spool half 14. Arranged in this manner, the material guide pathway 76 communicates at its opposite first and second ends 78, 80, respectively, with the primary winding area and with the auxiliary winding area defined by barrel insert 46.

As shown in FIGS. 2 and 3, each of the barrel inserts 44, 46 includes a second channel segment to define a second guide pathway 81 for the spool 10. As shown, a first end of the guide pathway 81 is located between the flange surfaces 42 adjacent the flange surface 42 of the second spool half 14. An opposite second end is located within the interior of the flange 18 of first spool half 12 to communicate with the auxiliary winding area defined by barrel insert 44.

Each of the channels 70, 72 formed in the inserts 44, 46 include sidewalls that are angled obliquely with respect to the adjacent surface 74 of the associated insert. As shown in FIG. 4, this construction defines a cross section for the channels 70, 72 that is substantially in the form of a parallelogram. The oblique angling of the sidewalls of the channels 70, 72 in this manner facilitates passage of a length of optical material, such as fiber 94, through the curving path defined by the guide pathways 76, 81. As shown, the channels 70, 72 are also provided with rounded corners to further eliminate potential impediment to passage of an elongated material through the guide pathways 76, 81.

Figure 5:
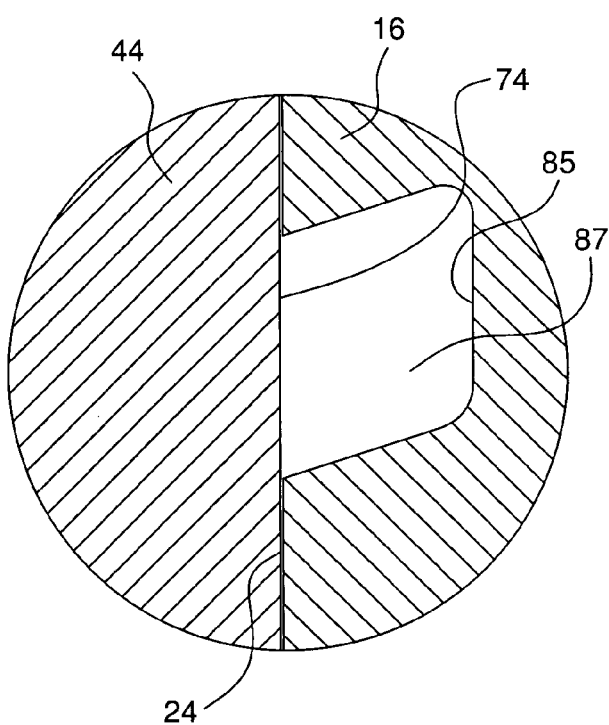
FIG. 5 is an enlarged detail of an alternate spool construction from that shown in FIG. 4.

The above-described channel segments 70, 72 defining the guide pathways 76, 81 of FIGS. 1–4 are formed in the outer surface 74 of the inserts 44, 46. Referring to FIG. 5, there is shown an alternate construction according to the present invention in which a channel 85 is formed in the inner surface 24 of the barrel portion 16 to define a material guide pathway 87 between the barrel portion 16 and insert 44.

To provide for passage of an elongated material between the channel segments 70, 72, each spool half 12, 14 includes an opening 86 in the end wall 26 of its barrel portion 16. The openings 86 are located on the end wall 26 such that they are aligned with each other when the spool halves 12, 14 are secured together by the fasteners 30. As shown in FIG. 3, each of the barrel portions 16 also includes a second opening it its end wall 26 located to provide communication between the segments of the second guide pathway 81.

Figure 6:
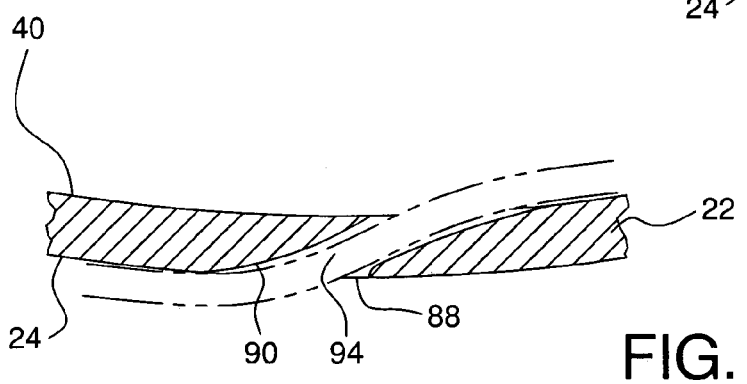
FIG. 6 is a partial sectional view taken along the line 6—6 of FIG. 1.

Referring to FIGS. 1 and 6, an access opening 88 is provided in the barrel portion 16 of the first spool half 12. The access opening 88 is located adjacent the first end 78 of the material guide pathway 76 to provide for passage of an elongated material, such as optical fiber 94, from the primary winding area to the material guide pathway 76. As shown in FIG. 6, the cylindrical wall 22 includes a beveled portion 90 adjacent the access opening 88 to facilitate insertion of an end portion of the optical fiber 94 into the material guide pathway 76 from the primary winding area. It should be understood that the present invention is not limited to winding of optical fibers and that the access opening 88 and the material guide pathway 76 could be adapted for directing elongated material of various cross section.

The channel segments 70, 72 formed on the inserts 44, 46 are curved in the following manner to provide for reversal in the orientation of an end portion of an elongated material inserted into the material guide pathway 76. The reversing of the end portion in this manner provides for simultaneous winding of the redirected end portion on the auxiliary winding area of insert 46 when the spool is rotated to wind another portion of the same length of material onto the primary winding area. Each channel segment 70, 72 includes first and second portions 82, 84. The first portion 82 extends in a spiral from one side of the associated insert toward an opposite side in a substantially circumferential manner. In the second portion 84, however, the channel segments 70, 72 are redirected in an axial direction to a substantially longitudinal orientation with respect to the spool 10 adjacent the ends 61 of the respective inserts 44, 46. Transitioning of the channel segments 70, 72 to an axial direction in this manner provides for alignment between the segments 70, 72 adjacent the insert ends 61, as shown in FIG. 1 for example.

Figure 7:
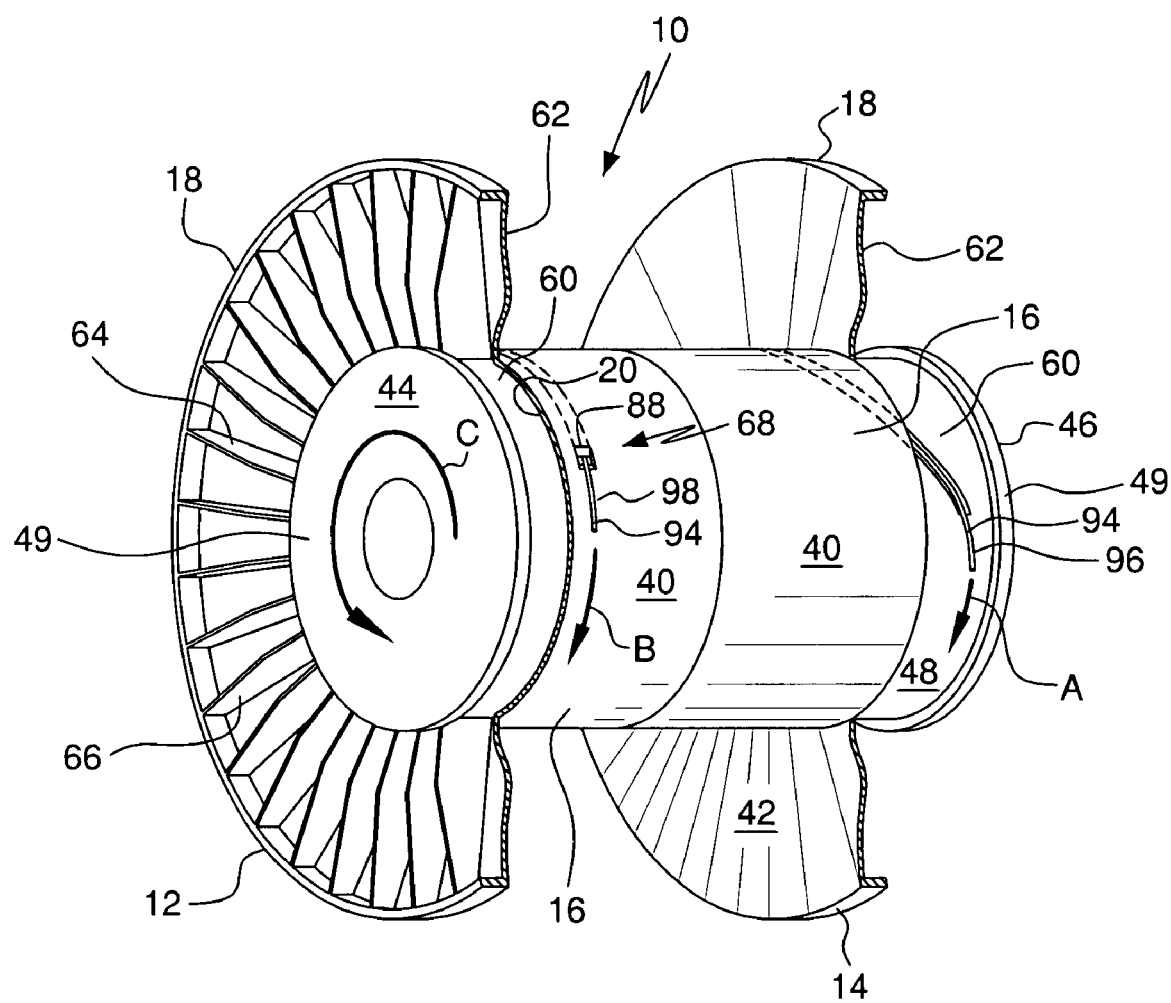
FIG. 7 is a perspective view of the spool of FIG. 1 illustrating an elongated material being simultaneously wound on primary and auxiliary winding areas of the spool.

The effect that reversing the end portion of an elongated material has on the windability of the material is illustrated in FIG. 7. As shown, a length of optical fiber 94 has been inserted into the material guide pathway 76 of the guide system 68 through access opening 88. The fiber 94 has been directed along the guide pathway 76 such that portions 96, 98 extend from opposite ends of the pathway 76 onto the primary winding area and the auxiliary winding area defined by insert 46. Each of the end portions 96, 98 is shown broken away for clarity of view. It should be understood, however, that each of the end portions 96, 98 would extend from the spool 10 in the directions shown by arrows A, B, respectively, to provide material to be wound onto the primary and auxiliary winding areas. As shown, the arrows A and B extend in the same circumferential direction with respect to the spool 10 because of the reversing spiral provided by the guide pathway 76 of guide system 68. Arranged in this manner, rotation of the spool 10 in the direction illustrated by arrow C will provide for simultaneous winding of the optical fiber portions 96, 98 on the auxiliary winding area and the primary winding areas.

In the present invention it is contemplated that one portion of the length of flexible material is wound on a primary winding area of the spool while another portion of the material length is simultaneously wound onto the auxiliary, or secondary, winding area of the spool. This is desirable for materials such as optical fibers, for example, where access to both ends of the length of material is desirable to facilitate integrity testing of the material. As described in greater detail, the present invention provides for simultaneous winding of a flexible material without sharp bends being introduced into the material that could damage an optical material or lead to a false indication of damage during integrity testing of the material.

In the embodiments illustrated, the simultaneous winding of material in the primary and auxiliary areas will be provided without any further redirecting of the optical fiber being needed. This differs from a material guide system defining a spiral pathway within the barrel portion of a spool that does not reverse in circumferential orientation in that above-described manner. Absent the reverse spiral arrangement of the present invention, the portion to be wound onto the auxiliary winding area would exit from the guide pathway in the auxiliary area in a circumferential direction opposite that of the material being wound onto the primary winding area. Winding of the end portion directed to the auxiliary area at the same time as the winding of the material in the primary area would require that the end portion be redirected in the opposite circumferential direction from that provided by the guide pathway. Such redirection would undesirably introduce a sharp bend in the material, which could lead to damage of an optical material or false indication of damage during an integrity test of the optical material.

The above-description of the reverse spiral path provided by the material guide system 68, and the resulting simultaneous winding, was described with respect to the material guide path 76 and the associated auxiliary winding area defined by insert 46. It should be understood that similar simultaneous winding of an end portion of a length of material onto the auxiliary winding area defined by insert 44 could be achieved by inserting the material in the second material guide pathway 81 instead of the first pathway 76.

Figure 8:
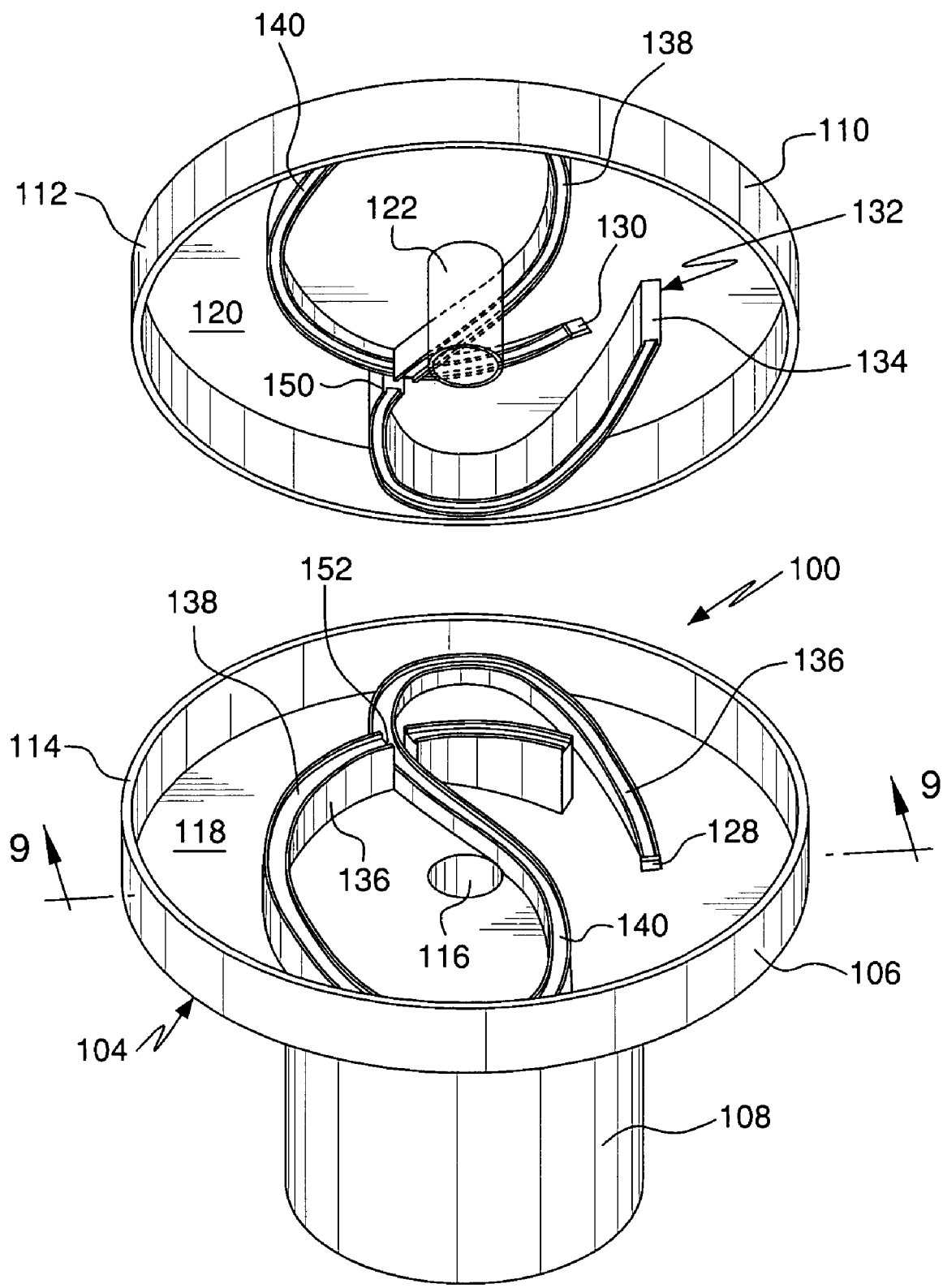
FIG. 8 is an exploded perspective view of one half of a spool according to a second embodiment of the invention.
Figure 9:
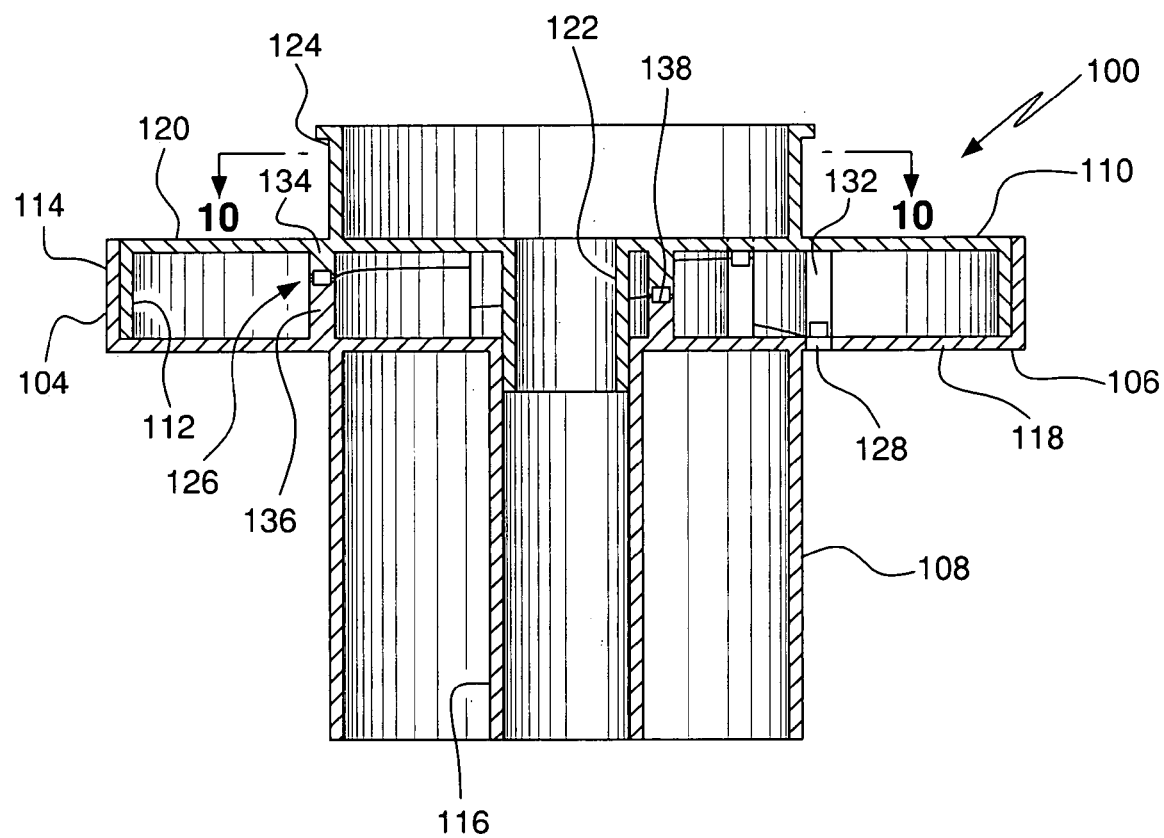
FIG. 9 is a sectional view taken along line 9—9 of FIG. 8.
Figure 10:
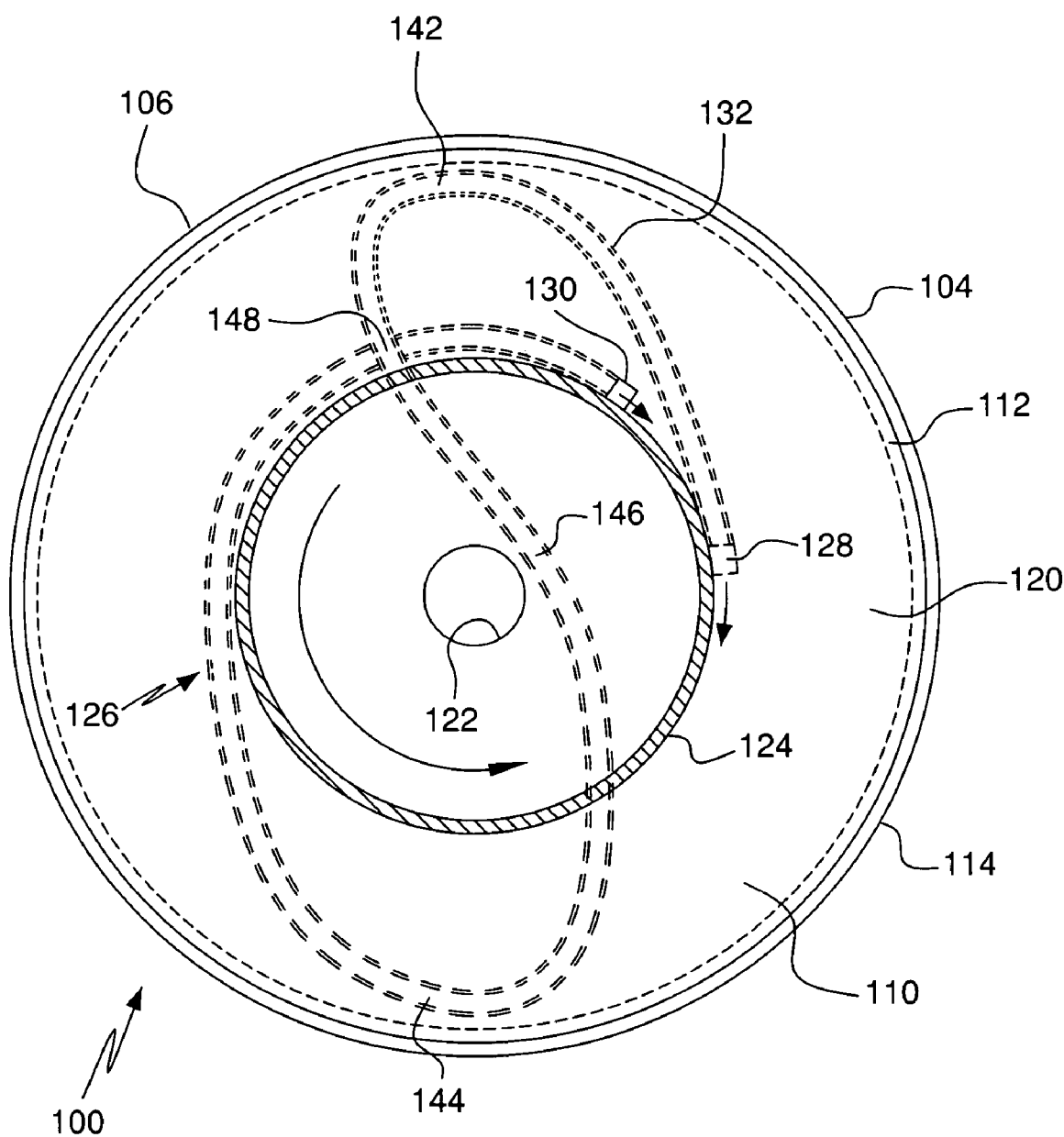
FIG. 10 is a top plan view of the half spool of FIG. 8.

In the spool 10 shown in FIGS. 1–7, the reversing spiral guide pathways 76, 81 are defined between the barrel portions 16 of the spool halves 12, 14 and the inserts 44,46. The present invention, however, is not limited to reversing helical guides located within the barrel. Referring to FIGS. 8–10, there is shown an alternative embodiment of a spool 100 according to the present invention defining a reversing spiral guide pathway 102 within an interior defined by a flange 104 of the spool 100. The flange 104 includes a body 106 integrally secured to a barrel portion 108 and a cover 110. The cover 110 of the flange 104 includes a cylindrical outer wall 112 slidingly received within a cylindrical outer wall 114 of the body 106. A barrel post 116 is integrally secured to a circular plate portion 118 of the flange body 106 and extends into the barrel 108.

The cover 110 of flange 104 includes a circular plate portion 120 and a flange post 122 integrally secured to the plate portion 120. As shown in FIG. 8, the barrel post 116 slidingly receives the flange post 122. Only one half of the spool 100 is shown, it being understood that the half spool shown is adapted for connection to another half spool including a barrel wall and post having recessed end portions for example. The barrel 108 defines a portion of a primary winding area for windingly receiving an elongated material. The spool 100 also includes a top cylinder 124 connected to the plate portion 120 of the flange cover 110 opposite the barrel 108. The top cylinder 124 of the flange cover 110 defines an auxiliary winding area for receipt of an end portion of an elongated material, in the manner described below.

Referring to FIG. 9, the body 106 of flange 104 defines an interior that is closed by cover 110 when the cover is received by the flange 104. The spool 100 includes a reversing spiral guide system 126 located within the interior defined by the flange 104. As shown in FIGS. 8 and 10, access openings 128, 130 are included in the plate portions 118, 120 of the body 106 and cover 110, respectively, of flange 104. The access openings 128, 130 are located adjacent the barrel 108 and the cover top cylinder 124 to provide for passage of the end portion of an elongated material from the primary winding area to the auxiliary winding area.

The guide system 126 of the spool 100 includes a guide structure 132 having upper and lower portions 134, 136 respectively secured to the cover 110 and body 106 of the flange 104. Each of the portions 134, 136 of the guide structure 132 includes a rectangular cross section having a height that ramps with respect to the plate portions 118, 120 of the body 106 and cover 110 to which it is secured. The lower portion 136 of the guide structure 132 ramps upwardly into the interior of the flange 104 from the access opening 128 communicating with the primary winding area. The upper portion 134 of the guide structure 132 ramps downwardly into the interior of the flange 104 from the access opening 130 communicating with the auxiliary winding area.

Each of the upper and lower portions 134, 136 of the guide structure 132 includes a channel 138 formed in an end 140 of the rectangular cross section that is remote from the respective plate portion 120, 118. As shown in FIG. 8, the upper and lower portions 134, 136 of the guide structure 132 define spiral paths within the interior of the flange 104 that are mirror images of each other. In this manner, the upper and lower portions 134, 136 of the guide structure 132 engage each other such that the channeled ends 140 contact each other to form an enclosed pathway. As shown in FIG. 9, the enclosed pathway defined by the guide structure 132 has a rectangular cross section and progresses upwardly within the interior between the access openings 128, 130.

Referring to FIG. 10, the spiral path defined by the guide structure 132 includes first and second portions 142, 144 that are substantially helical in configuration. A transition portion 146 of the guide structure 132 interconnects the first and second helical portions 142, 144. As shown, the substantially helical portions 142, 144 are reversed in circumferential direction with respect to a winding direction of the spool 100. From the point of view shown in FIG. 10, an elongated material passing through the guide structure 132 from access opening 128 to access opening 130 will be turned in a generally counterclockwise direction through the first helical portion 142. The material will then be turned in a generally clockwise direction through the second helical portion 144. As shown by the arrows, portions of the same length of material directed through the guide structure 132 would be directed from opposite ends of the guide structure 132 in the same circumferential direction with respect to the spool (clockwise in FIG. 10).

As shown in FIGS. 8 and 10, the reversing spiral guide structure 132 crosses over itself at location 148. To provide for the required crossing of the guide structure 132, the upper and lower portions 134, 136 of the guide structure 132 include respective discontinuities 150, 152 allowing each of the upper and lower portions 134, 136 to cross itself at location 148. By directing a length of material in this manner, the reversing spiral guide system 126 provides for simultaneous winding of portions of the material in the primary and auxiliary winding areas upon rotation of the spool (in a counterclockwise direction in the view shown in FIG. 10).

The enclosed pathway defined by the guide structure 132 of spool 100 is substantially square in cross section as shown in FIG. 9. It should be understood, however, that the channeled ends 140 of the upper and lower portions 134, 136 of guide structure 132 could be modified to accommodate materials of variously shaped cross sections.

The spools 10, 100 are preferably molded from a plastic material. By incorporating spool halves 12, 14 receiving inserts 44, 46 in the spool 10 of FIGS. 1–7 and cover and body portions 110, 106 of flange 104 in the spool 100 of FIGS. 8–10, the formation of the spools 10, 100 in a molding process is facilitated. The construction of the spools 10, 100, therefore, promotes economy of manufacture.

The foregoing describes the invention in terms of embodiments foreseen by the inventor for which an enabling description is available, notwithstanding that insubstantial modifications of the invention, not presently foreseen, may nonetheless represent equivalents thereto.

What is claimed is:

1. A device for winding an elongated flexible material, the winding device comprising:
   an elongated barrel defining a primary winding surface, the barrel positioned about an axis of rotation for the device;
   a flange wall connected to the barrel and projecting radially outwardly of the primary winding surface;
   an auxiliary winding surface separated axially from the primary winding surface by the flange wall; and
   a guide pathway located radially inward of the primary winding surface, the guide pathway including opposite first and second ends respectively communicating with the primary and auxiliary winding surfaces for directing an elongated flexible material therebetween,
   the guide pathway including first and second end segments, respectively adjoining the first and second ends and interconnected to each other by a transition segment extending in a substantially axial direction, at least a portion of each of the first and second end segments of the guide pathway directing the flexible material in substantially the same circumferential direction with respect to the axis of rotation, the transition segment defining a reversal in the direction of curvature of the guide pathway between the first and second end segments to provide for simultaneous winding of the flexible material onto the primary and auxiliary winding surface during rotation of the device.

2. The winding device according to claim 1, wherein the barrel includes first and second barrel parts respectively carried by first and second members securable to each other, each of the barrel parts defining a portion of the primary winding surface.

3. The winding device according to claim 2, wherein each of the barrel-carrying members includes a cylindrical wall defining the associated barrel part, each barrel-carrying member further including an end wall adjacent an end of the cylindrical wall, the end wall of each barrel-carrying member including at least one opening, the at least one end wall opening of each barrel-carrying member alignable with the at least one end wall opening of the other barrel-carrying member for receipt of a fastener.

4. The winding device according to claim 1, wherein the barrel includes opposite ends and wherein the winding device includes two flange walls and two auxiliary winding surfaces, one of the flange walls and one of the auxiliary winding surfaces located adjacent one of the opposite ends of the barrel, and wherein the winding device further includes two guide pathways each having a first end communicating with the primary winding surface and an opposite second end communicating with one of the auxiliary winding surfaces.

5. A device for winding an elongated flexible material, the winding device comprising:
an elongated barrel defining a primary winding surface, the barrel positioned about an axis of rotation for the device;
a flange wall connected to the barrel and projecting radially outwardly from the barrel winding surface;
an auxiliary winding surface separated axially from the primary winding surface by the flange wall; and
a guide pathway including opposite first and second ends respectively communicating with the primary and auxiliary winding surfaces for directing an elongated flexible material therebetween,
the guide pathway including opposite end segments interconnected by a transition segment, at least a portion of each of the end segments of the guide pathway directing the flexible material in a substantially circumferential direction with respect to the axis of rotation, the guide pathway reversing in direction of curvature in the transition segment to provide for simultaneous winding of the flexible material onto the primary and auxiliary winding surface during rotation of the device, wherein at least a portion of the guide pathway is located within an interior area defined by the barrel.

6. The winding device according to claim 5 further including an insert received within the interior area of the barrel through an open end of the barrel, at least a portion of the guide pathway being defined between the insert and the barrel.

7. The winding device according to claim 6, wherein a channel is formed in an outer surface of the insert to define the portion of the guide pathway between the outer surface of the insert and an inner surface of the barrel.

8. The winding device according to claim 6, wherein a portion of the insert extends from the open end of the barrel to define the auxiliary winding surface.

9. A device for winding an elongated flexible material, the winding device comprising:
an elongated barrel defining a primary winding surface, the barrel positioned about an axis of rotation for the device;
a flange wall connected to the barrel and projecting radially outwardly from the barrel winding surface;
an auxiliary winding surface separated axially from the primary winding surface by the flange walk; and
a guide pathway including opposite first and second ends respectively communicating with the primary and auxiliary winding surfaces for directing an elongated flexible material therebetween,
the guide pathway including opposite end segments interconnected by a transition segment, at least a portion of each of the end segments of the guide pathway directing the flexible material in a substantially circumferential direction with respect to the axis of rotation, the guide pathway reversing in direction in the transition segment to provide for simultaneous winding of the flexible material onto the primary and auxiliary winding surface during rotation of the device;
wherein the barrel includes first and second barrel parts respectively carried by first and second members securable to each other, each of the barrel parts defining a portion of the primary winding surface;
wherein each of the barrel-carrying members includes a cylindrical wall defining the associated barrel part, each barrel-carrying member further including an end wall adjacent an end of the cylindrical wall, the end wall of each barrel-carrying member including at least one opening, the at least one end wall opening of each barrel-carrying member alignable with the at least one end wall opening of the other barrel-carrying member for receipt of a fastener; and
the winding device further including first and second inserts each received within an interior defined by the respective first and second barrel-carrying member, the insert received through an open end of the cylindrical wall opposite the end wall.

10. The winding device according to claim 9, wherein each of the inserts includes a channel formed in an outer surface of the insert to define the guide pathway between the outer surfaces of the inserts and inner surfaces defined by the cylindrical walls of the barrel-carrying members.

11. A winding spool comprising:
first and second barrel parts each including a cylindrical wall having an inner surface defining an interior and an outer surface defining a portion of a primary winding area for the winding spool, the cylindrical wall including opposite first and second ends, each of the barrel parts including an end wall connected to the cylindrical wall adjacent to the second end, the end walls of the barrel parts including aligned openings for receiving fasteners to secure the barrel parts to each other;
first and second inserts each having a cylindrical outer surface, the inserts respectively received within the interior of the first and second barrel parts through the first ends of the cylindrical wall such that a portion of the insert extends beyond the first end of the cylindrical wall, the extending portion of each of the inserts defining an auxiliary winding area;
first and second flange walls respectively connected to the cylindrical wall of the first and second barrel parts, each flange wall located between the portion of the primary winding area defined by the associated barrel part and the auxiliary winding area defined by the associated insert; and first and second guide pathways for respectively directing an elongated flexible material between the primary winding area and the first and second auxiliary winding areas, each guide pathway including opposite ends respectively communicating with the primary winding area and the associated auxiliary winding area, each guide pathway defined by a pair of channels each formed in the outer surface of one of the first and second inserts, each channel including first and second portions, the second portion of each channel extending to an end of the associated insert, the first portion of each channel curving in a substantially circumferential direction with respect to an axis of rotation for the spool, the second portion of each channel oriented substantially axially with respect to the axis of rotation adjacent the end of the insert, each of the channel pairs arranged such that curvature of the resulting guide pathway is reversed in circumferential direction in the second portions of channel pair to provide simultaneous winding of an elongated flexible material in the primary winding area and the associated auxiliary winding area.

12. A device for winding an elongated flexible material, the winding device comprising:
a barrel defining a primary winding area;
a flange wall connected to the barrel;
an auxiliary winding area separated from the primary winding area by the flange wall; and
a guide pathway including opposite first and second ends respectively communicating with the primary and auxiliary winding areas for directing an elongated flexible material therebetween, wherein at least a portion of the guide pathway is located within an interior area defined by the barrel,
the guide pathway including opposite end segments interconnected by a transition segment, at least a portion of each of the end segments of the guide pathway curving in a substantially circumferential direction with respect to an axis of rotation of the winding device, the guide pathway reversing in direction of curvature in the transition segment to provide for simultaneous winding of an elongated flexible material in the primary and auxiliary winding areas.

13. The winding device according to claim 12 further including an insert received within the interior of the barrel through an open end of the barrel, at least a portion of the guide pathway being defined between the insert and the barrel.

14. The winding device according to claim 13, wherein a channel is formed in an outer surface of the insert to define the portion of the guide pathway between the outer surface of the insert and an inner surface of the barrel.

15. The winding device according to claim 13, wherein a portion of the insert extends from the open end of the barrel to define the auxiliary winding area.

16. A device for winding an elongated flexible material, the winding device comprising:
a barrel defining a primary winding area, wherein the barrel includes first and second barrel parts respectively carried by first and second members securable to each other, each of the barrel parts defining a portion of the primary winding area, wherein each of the barrel-carrying members includes a cylindrical wall defining the associated barrel part and an end wall adjacent an end of the cylindrical wall, the end wall of each barrel-carrying member including at least one opening alignable with the at least one end wall opening of the other barrel-carrying member for receipt of a fastener;
a first and second insert each received within an interior defined by the respective first and second barrel-carrying member, the insert received through an open end of the cylindrical wall opposite the end wall;
a flange wall connected to the barrel;
an auxiliary winding area separated from the primary winding area by the flange wall; and
a guide pathway including opposite first and second ends respectively communicating with the primary and auxiliary winding areas for directing an elongated flexible material therebetween,
the guide pathway including opposite end segments interconnected by a transition segment, at least a portion of each of the end segments of the guide pathway curving in a substantially circumferential direction with respect to an axis of rotation of the winding device, the guide pathway reversing in direction of curvature in the transition segment to provide for simultaneous winding of an elongated flexible material in the primary and auxiliary winding areas.

17. The winding device according to claim 16, wherein each of the inserts includes a channel formed in an outer surface of the insert to define the guide pathway between the outer surfaces of the inserts and inner surfaces defined by the cylindrical walls of the barrel-carrying members.

* * * * *